No. 702,152. Patented June 10, 1902.
R. F. PIATT.
ELECTRIC CONTROLLING APPARATUS.
(Application filed Feb. 25, 1902.)
(No Model.) 2 Sheets—Sheet 1.

WITNESSES:
INVENTOR
Richard F. Piatt
BY
ATTORNEY

No. 702,152. Patented June 10, 1902.
R. F. PIATT.
ELECTRIC CONTROLLING APPARATUS.
(Application filed Feb. 25, 1902.)
(No Model.) 2 Sheets—Sheet 2.

WITNESSES
R. M. Kelly
John MacMaster.

INVENTOR
Richard F. Piatt
By his attorney

UNITED STATES PATENT OFFICE.

RICHARD F. PIATT, OF LOUISVILLE, KENTUCKY, ASSIGNOR TO JOSEPH McWILLIAMS AND COMPANY, OF LOUISVILLE, KENTUCKY, A CORPORATION OF KENTUCKY.

ELECTRICAL CONTROLLING APPARATUS.

SPECIFICATION forming part of Letters Patent No. 702,152, dated June 10, 1902.

Application filed February 25, 1902. Serial No. 95,530. (No model.)

*To all whom it may concern:*

Be it known that I, RICHARD F. PIATT, of Louisville, county of Jefferson, State of Kentucky, have invented an Improvement in Electric Controlling Apparatus, of which the following is a specification.

My invention relates to electric controlling apparatus; and it consists of the improvements which are fully set forth in the following specification and are shown in the accompanying drawings.

It is the object of my invention to enable an electric controller which operates as a starting device for the motor when the current is turned on to automatically regulate the speed of the motor after it has been started by the action of a fluid-pressure motor connected with a pump, compressor, or other fluid moving device operated by the motor.

While my invention may be used in connection with any fluid moving device operated by an electric motor, it is especially adapted for use in connection with a vacuum-pump for the purpose of regulating the speed of the motor and pump to maintain a desired partial vacuum. It is to be understood, however, that the term "pressure" as used in the specification and claims refers to a pressure either above or below atmosphere.

In carrying out my invention I employ a fluid-pressure motor which is operatively connected with the electric controller, so as to control its operation under electrical action and which is controlled by the pressure produced by the pump or other fluid moving device. While I have shown a form of electric controller especially adapted for use in connection with the fluid-pressure motor, I do not mean to limit my invention to this particular form.

One feature of my invention resides in the employment of means to permit the moving parts of the electric controller to return immediately to "off" position when the electric circuit through the controller is open independently of the pressure acting on the pressure-motor.

Figure 1:
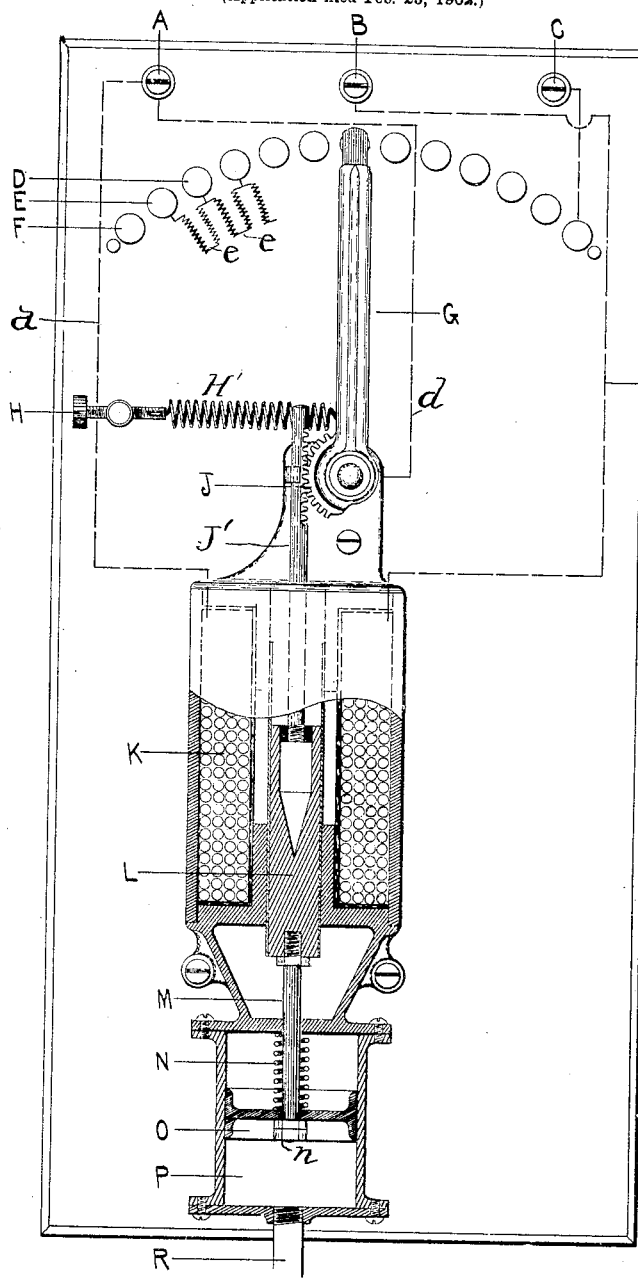
Figure 2:
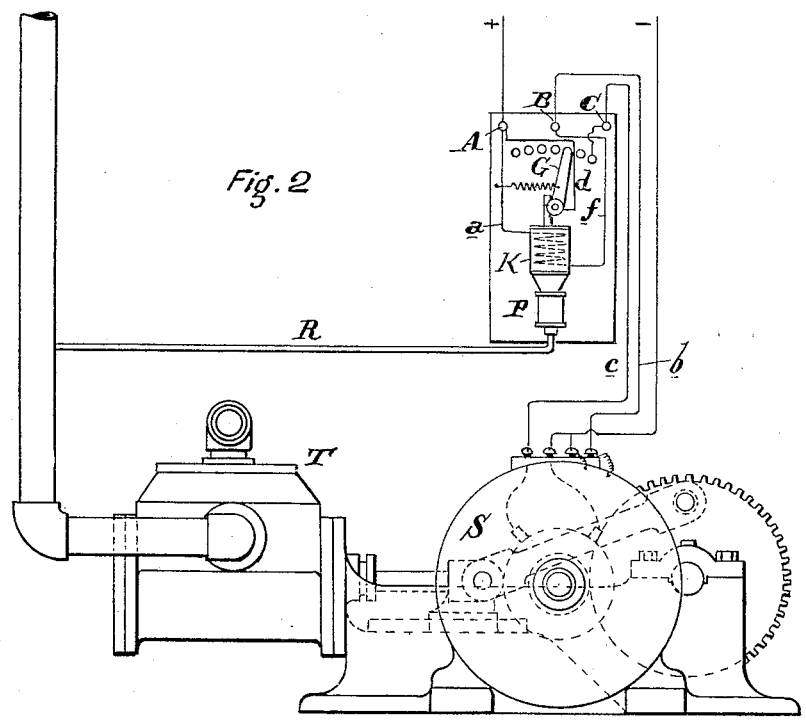
Figure 3:
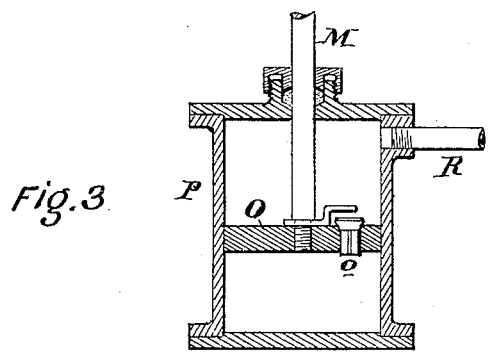

In the accompanying drawings, Figure 1 is a plan view, with part in vertical section, of my preferred form of electric controller with the fluid-pressure motor. Fig. 2 is a diagram showing the connection of the controlling devices with the electric motor and pump or fluid moving device. Fig. 3 is a vertical sectional view of the fluid-pressure motor, illustrating a modification.

S is an electric motor which operates the pump, compressor, or other fluid moving devices T.

A and C are the terminals of the line-circuit on the controller, to the terminal C of which the armature-circuit $c$ of the motor is attached.

B is the terminal on the controller, to which the field-circuit $b$ to the motor is attached.

G is the usual rocking contact-arm of an ordinary electric controller adapted to make contact with the contact-points F E D, &c., of which E D, &c., control resistances $e$ in circuit with the terminal C. The arm G is operatively connected by gears J with the rod J', carried by the movable magnetic core L in a solenoid K, which is in circuit with the terminals A B through the conductors $a\ f$. The contact-arm G is electrically connected with the terminal A by a conductor $d$. The solenoid K may be either of a stopped type, as shown, or of any other suitable form.

P is a cylinder having a connection R with the pump, compressor, or other fluid moving device T to be controlled. If the pump is a vacuum-pump, the connection R will lead from the suction-line and be made with the lower part of the cylinder, as shown in Fig. 1; but if the device is used with a compressor the connection will lead from the pressure-line and will be made with the upper part of the cylinder, as shown in Fig. 3.

O is a piston in the cylinder, and M is a piston-rod carried by the core L and operatively connected with the piston by a nut or head $n$, which enables the piston-rod to lift the piston. A spring N between the cylinder-head and piston maintains the piston against the nut or head $n$.

H' is a spring connected with the contact-arm G and tending to return it normally to the off point F. As shown, one end of the spring is connected with an adjusting-screw H, by which the tension of the spring on the arm G may be adjusted.

The operation of the controller is as follows: Supposing the contact-arm G to be at the off point F, (in which position it would be normally held by the spring H',) when the switch is closed and the electric circuit is completed through the motor and controller the current entering at A will pass through the conductor $a$ and solenoid K and out through the conductor $f$ to the contact B, and thence through the conductor $b$ around the fields of the motor T. The solenoid thus energized will raise the magnetic core L and rock the contact-arm G into contact with the contact-point E, which will cut in the armature-circuit of the motor. This movement of the core L and contact-arm G will continue until it is overcome by the pressure or partial vacuum in the cylinder P, and the arm G will pass slowly over the various contact-points E D, &c., until all the controlling resistance is cut out. The piston in the cylinder, acting as a dash-pot, will cause the core L to rise slowly, cutting out the resistance as the motor increases in speed. As the motor operates the pump or compressor the vacuum or pressure created thereby acting on the piston O in the cylinder P will depress it and lower the solenoid-core to the extent to which the parts have been adjusted. This will correspondingly move the contact-arm until it moves over sufficient of the contact-points D E, &c., to cut in the resistance required to reduce the motor to the proper speed. The piston O will thus operate against the upward pull of the solenoid to control the amount of resistance in the motor-circuit, and thus govern its speed to produce the desired partial vacuum or pressure in the pipe with which the cylinder P is connected. When the motor-circuit is opened and the circuit through the controller is broken, the spring H' will immediately restore the contact-arm G to the normal off position. As the rod M slides loose in the piston O, the piston will not retard the quick return of the contact-arm G to the off position. It will be observed that when the electric current is turned on the motor is immediately started, and its speed is subsequently controlled by the movement of the solenoid-core and contact-arm under the action of the fluid-pressure motor.

Instead of the loose connection of the piston O with the rod M it may be secured to the rod and provided with a check-valve $o$, as shown in Fig. 3, opening upward in the case of pressure in the cylinder P and downward in the case of a partial vacuum. Such construction will have the same effect as that shown in Fig. 1 in relieving the dash-pot effect of the piston O and permitting it and the contact-lever G to be quickly returned to the off position when the electric circuit is broken.

Other forms of pressure-motors may be used instead of those shown, as these and other details may be varied without departing from my invention.

What I claim as new, and desire to secure by Letters Patent, is as follows:

1. The combination with an electric motor and a fluid moving device operated thereby, of an electric stopping and starting device in circuit with the motor, provided with controlling means for controlling the speed of the motor after it has been started, and a fluid-pressure motor controlling said means for controlling the speed of the motor controlled by the pressure produced by said fluid moving device.

2. The combination with an electric motor and a fluid moving device operated thereby, of a solenoid in circuit with the motor, a contact-arm controlled by the magnetic core of the solenoid, resistances for controlling the motor controlled by the contact-arm, and a fluid-pressure motor controlling the magnetic core of the solenoid and controlled by the pressure produced by said fluid moving device, whereby the motor is started by the solenoid and its speed is controlled by the movement of the magnetic core and contact-arm under the control of the fluid-pressure motor.

3. In controlling apparatus for the purpose described, the combination with an electric motor and a fluid moving device operated thereby, of an electric controller for controlling the speed of the electric motor, means to automatically throw said controller into "off" position when the circuit is open, a fluid-pressure motor controlling said electric controller and controlled by the pressure produced by said fluid moving device, and means to permit said controller to return to the "off" position, when the circuit is open, independently of the pressure acting on said pressure-motor.

4. In controlling apparatus for the purpose described, the combination with the electric motor and fluid moving device operated thereby, of an electric controller for controlling the speed of the electric motor, means to automatically throw said controller to the "off" position when the circuit is open, a cylinder communicating with said fluid moving device, a piston in the cylinder controlled by the pressure produced in the cylinder by the fluid moving device, and a loose connection between said controller and the piston, whereby said controller may return to the "off" position, when the circuit is open, independently of the pressure acting on said pressure-motor.

5. In controlling apparatus for the purpose described, the combination with an electric motor and a fluid moving device operated thereby, of an electric controller for controlling the speed of an electric motor, means to automatically throw said controller to the "off" position when the circuit is open, a cylinder communicating with the said fluid moving device, a piston in said cylinder controlled by the pressure produced in the cylinder by the fluid moving device, a rod M connected with a moving part of the controller and extending through the piston and loosely connected therewith by the head or nut $n$, and a spring acting on the piston.

6. In a controlling device for the purpose described, the combination of a solenoid and its magnetic core, a moving contact-arm operatively connected with the magnetic core, a fluid-pressure motor operatively connected with the magnetic core and adapted to control it by the pressure acting on said motor, an electric circuit embracing said solenoid, and an electric circuit embracing resistance-contacts controlled by said contact-arm.

7. In a controlling device for the purpose described, the combination of a solenoid and its magnetic core, a movable contact-arm operatively connected with the magnetic core, a fluid-pressure motor operatively connected with the magnetic core and adapted to control it by the pressure acting on said motor, an electric circuit embracing resistance-contacts controlled by said contact-arm, a spring acting on said contact-arm and adapted to return it to "off" position when the circuit through the solenoid is open, and means to permit the magnetic core to return, when said circuit is open, independently of the pressure acting on said pressure-motor.

In testimony of which invention I have hereunto set my hand.

RICHARD F. PIATT.

Witnesses:
P. H. SAVAGE,
F. C. SAVAGE.